US005755962A

United States Patent [19]
Gershenson et al.

[11] Patent Number: 5,755,962
[45] Date of Patent: May 26, 1998

[54] FILTER BAG AND PROCESS OF MANUFACTURE

[75] Inventors: Moshe Gershenson, Mohegan Lake, N.Y.; Robert S. Elliott, Milton, N.J.; John Pearson, Ringwood, N.J.; Edward G. Malawer, Wayne, N.J.

[73] Assignee: ISP Investments Inc., Wilmington, Del.

[21] Appl. No.: 756,733

[22] Filed: Nov. 26, 1996

[51] Int. Cl.⁶ .......................... B01D 29/33; B01D 39/16
[52] U.S. Cl. .................. 210/452; 210/487; 210/490; 210/497.1; 55/368; 55/376; 55/380
[58] Field of Search ..................... 210/448, 452, 210/487, 494.1, 494.3, 488, 489, 490, 497.01, 497.2, 497.1; 55/363, 368, 376, 380, 382

[56] References Cited

U.S. PATENT DOCUMENTS

| | | | |
|---|---|---|---|
| 4,247,394 | 1/1981 | Schmidt, Jr. | 210/484 |
| 4,545,833 | 10/1985 | Tafara | 210/497.01 |
| 4,624,784 | 11/1986 | Lefebvre | 210/450 |
| 4,877,526 | 10/1989 | Johnson et al. | 210/448 |
| 5,075,004 | 12/1991 | Gershenson et al. | 210/445 |
| 5,091,085 | 2/1992 | Thalmann et al. | 210/321.65 |
| 5,417,855 | 5/1995 | Gershenson | 210/446 |
| 5,620,669 | 4/1997 | Plinke et al. | 55/514 |

Primary Examiner—W. L. Walker
Attorney, Agent, or Firm—Marilyn J. Maue; Joshua J. Ward; William J. Davis

[57] ABSTRACT

A prefilter bag for insertion into a standard filtration bag apparatus, having a filtration assembly comprising a seamless filter membrane having uniform pore openings preselected within the range of between about 2 and about 50 microns (μ) and a linearly channeled, non-deformable, semi-rigid liquid transport thermoplastic sheet in the form of a molded webbing or netting in contact with the upper surface of the filter membrane; said webbing having marginal edges which are coextensive with those of the membrane; said assembly adapted to be shaped by continuous winding of the assembly upon itself for 2 to 5 complete convolutions around a tubular mandrel so as to form a cylindrical tube or cone; the bottom of said cylinder being sealed to prevent liquid leakage and the top of said cylinder, forming a liquid inlet opening, being sealed to a retaining ring adapted to be inserted in, attached to or sealed to an outer, retaining ring of a non-wrapped filter bag. The inlet of the wrapped cylindrical bag is optionally fitted with vortex directing means to enhance a linearly tangential direction of the entering liquid against the walls of the inside membrane. The invention also pertains to a method for the fabrication and use of the present filtration bag.

29 Claims, 7 Drawing Sheets

FILTER BAG AND PROCESS OF MANUFACTURE

Flexible filter devices for clarifing a pressurized liquid comprising one or several bags mounted one within the other, are well known as is variously described in British patent 2,168,906 and U.S. Pat. No. 5,417,855; 5,075,004; 4,545,833; 4,247,394 and 3,937,621. However, a persistent problem associated with bags of this type is leakage during use through the ring mounting and through sewn seams of the individual bags. In an attempt to remedy this problem, Johnson, in U.S. Pat. 4,877,526 proposes a seamless flexible filter bag with interposed fluid transport means having perforations of decreasing size which is achieved by extensive wrapping of a filtration membrane surfaced with an essentially narrower strip of diminishingly apertured transport material around a cylindrical mandrel to provide a bag having a large number of wrapped layers and then completely sealing the final exposed edge of the wrapped material to the underlying filter layer. While this arrangement solves leakage problems, it is, for the most part, unsuitable for high pressure filtration or for use as a prefilter to extend the life of commercial filter bags currently in use. Under pressure the apertured transport means of Johnson is weakened by its perforated, flexible structure which causes it to rupture or to collapse against the walls of the downstream filtering media during the annular pressurized passage of fluid through the bag thus obstructing liquid flow. Secondly, patentee's filter bag is subject to early plugging due to the amount of filtered solids which accumulate in the bottom and lower portions of the bag. A further disadvantage is the diminishing hole size in the transport means which causes blockage due to downstream solids buildup thus contaminating the filtered liquid entering the final transport zones. Finally, the patented filter bag, having a sealed non permeable outer seam, provides no means for transferring liquid to a commercial filtration assembly when the wrapped filter assembly becomes spent. Obviously, such a device is unsuitable as a prefilter, as it would be necessary to disassemble the entire filtration apparatus in order to remove the inner prefiltration device when fully loaded.

It is an object of this invention to overcome the above difficulties and shortcomings associated with prior filter bags and to extend the life and filtration capacity normally associated with filter bags currently in use.

Another object of the invention is to provide a commercially effective prefilter bag which does not require dismantling of an outer commercial filtration apparatus when the prefilter becomes fully loaded.

Still other objects are to provide means for uniform distribution of solids on the upper and lower walls of the bag during use, to provide a non-deformable semirigid transport means in the bag assembly and to overcome all problems of prefiltered liquid leakage.

Finally, it is an object to provide an economical and commercially feasible method for the manufacture and use of the improved filter bag herein described.

These and other objects of the invention will become apparent from the following description and disclosure.

THE INVENTION

In accordance with this invention there is provided a filter bag assembly comprising a pair of porous filtration membranes and a molded, channeled liquid transport means interfaced between said membranes for directing uniform flow of filtratable liquid over the entire surface of the membrane on the downstream side. As an embodiment of this invention, the filtration membrane is a sheet surfaced with a coextensive sheet of molded, channeled liquid transport means to form a composite and the composite is convolutely wrapped 2-5 times upon itself to provide a cylindrical, seamless multilayered filtration bag structure. The filter membrane of the present invention is a continuous sheet of porous material which is preferably made of a thermoplastic in the form of blown microfibers, such as fibers of blown polypropylene, nylon or polyester; although spunbonded non-woven material or felt can also be employed as the filtration membrane when larger pore sizes are desired. The top marginal edge and the bottom marginal edges of the filter membrane are contiguous and coextensive with the top and bottom marginal edges of the transport means. In general, the filtration membrane has an approximately uniform pore size which can be within the range of from 2 to 50μ preferably from 5 to 20μ and has a thickness of from about 0.05 to about 0.50 cm. The most desirable filtration materials are those which can be ultrasonically fused around a structural retaining ring of rubber, metal or plastic forming the liquid inlet and which can also be fused upon itself to seal the bottom of the filter bag. The bottom of the bag is sealed by a fused rounded or tapered seam or it can be gathered and sealed as described in U.S. Pat. No. 4,877,526. It is to be understood that methods of leakproof closure include ultrasonic welding, stitching, hot air welding or other conventional techniques adaptable to the present system.

The non-deformable, channeled transport means of this invention is a continuous, three dimensional sheet of a preformed, molded plastic; wherein spaced horizontal channels, extending the entire length of the sheet in the direction of liquid flow, are reinforced with a plurality of spaced transversely intersecting ribs to provide a semi-rigid structure. The channels can be hollow depressed conduits whose sides are supported by the intersecting ribs which transfect the channels at from a 45 to 90 degree angle and extend from the top to the bottom marginal edge of the transport sheet; however, solid or hollow grooves disposed above and integrally mounted over 90 degree angle transecting ribs are preferred. The thickness of the transport means is within the range of that described for the filtration membrane; although a thickness approximately equal to that of the membrane is preferred.

The spaced distance between the channels can be between 0.2 to 2 times the distance between the ribs and is desirably 0.04–0.2 inch. The stiffened reinforced transport means of the present invention insures against its collapse against the walls of the filter membrane and further directs the flow of liquid in an annular/radial motion over the entire surface of the successive layers of filter membrane. Another advantage of the present transport means is its ability to bypass liquid flow from clogged pore areas and to transport the liquid to an unclogged area of the membrane surface for continued radial flow through the downstream membrane. Additionally, since the flow of liquid is uniformly directed to all portions of the filter membrane wall, the deposition of filtered solids is evenly distributed and is prevented from accumulating and plugging the lower portion of the filter bag resulting in premature disfunction. Accordingly, the filterable life of the present bag assembly is significantly extended. In summary, the liquid flow pattern of the present assembly is one of series/parallel flow.

More specifically, the liquid is directed from radial flow to a tangential or parallel direction when it encounters resistance caused by a clogged pore area of the membrane. This flow pattern continues until an unclogged area is encountered, at which point the radial flow direction of the liquid through the membrane is resumed. In this way the contaminants are uniformly distributed over the membrane surfaces and premature plugging of the filter bag is avoided. The benefits resulting from this flow pattern include a significantly extended filter life and increased contaminant loading capacity.

The fluid transport sheet can be composed of any thermoplastic material capable of being molded or extruded into the present semi-rigid shape; however, extruded polypropylene netting has been found to be most effective for its resistance to abrasion and rupture and its sealability under mild conditions.

The present filter bag is ideally employed as a prefilter for non-wrapped commercial filter bags as described for example in U.S. Pat. Nos. 5,358,638 and 5,417,855. In this arrangement, the present prefilter bag is inserted into the commercial filter bag assembly and the later becomes the final filter. Accordingly the prefilter bag is of a size which can accommodate insertion and mounting within the outer bag assembly. In general, the diameter of the prefilter bag is usually between about 4 and about 10 inches and the unit has a length of from approximately 9 to 30 inches; although other bag dimensions are contemplated as being within the scope of this invention. The prefilter bag can be attached, supported and retained on the same retaining ring as the outer bag assembly, as shown in the above patents or it can be independently mounted on a separate ring which fits snugly against the walls of an outer retaining ring assembly.

Importantly, when employed as the prefilter, the initial and final longitudinal sides of the wrapped filter bag remain open to allow the flow of fluid to the final filter device. Specifically, the overlapped longitudinal edge end of the prefilter can be spot welded to an underlying membrane layer so as to leave liquid bypass gaps between the weld sites which permit liquid transfer even after the prefilter becomes inoperable due to plugging and avoids the need for immediate removal of the filter bag. The safety bypass also greatly reduces the pressure differential between the filtration layers and thereby minimizes the occurrence of rupture during high pressure filtration.

As a modification of the present filter bag, the throat or liquid inlet portion thereof can be fitted with vortex means. This modification can be employed to increase the volume of liquid effectively processed before clogging occurs, thereby extending the life of the bag. The liquid vortex feed path can be provided by altering the liquid inlet at the bag retaining means to include a directional, sealably affixed or side attached narrower tube or a nozzle adapted to direct entering liquid against the inner walls of the filter bag, thus augmenting helical flow parallel to the walls of the bag. As an alternative for achieving uniform helical flow, an annular circulating blade or a fixed baffle directing liquid to the bag side walls can be employed to provide circular motion of the liquid entering the filter bag, thus creating a cavity or vacuum in the center of the bag to assure contact with the upper side wall portions of the filter and transport means surfaces. In still another modification, the bag inlet can be fitted with narrow venturi tube having flexible vertical sides responsive to a restriction means such as a screw closure or valve for adjusting flow pressure of the incoming liquid during the filtration operation. It is also within the scope of this invention to employ a series of individual wrapped filter bags of the present design, mounted each within the other and each of a progressively decreasing pore size. This concept is particularly attractive when filtering liquids containing particles of widely different diameters. Still another innovation consists of mounting a sleeve of the present transport means inside and/or outside of the wrapped filter to provide increased structural stability and enhanced liquid flow. These and many other embodiments and modifications are considered to be within the scope of the present basic concept.

The manner of fabricating the present filter assembly is both economical and labor cost effective. The process comprises laying a sheet of the fluid transport material over a sheet of filter membrane having substantially similar dimensions. The leading edge of the transport sheet is optionally attached or spot welded to the underlying membrane. The resulting assembly which forms a composite is then wrapped around a rigid mandrel of suitable dimension to provide from 2 to 5 layers of the composite membrane/transport material with the transport means forming the innermost surface and the membrane forming the outermost surface. The bottom end portion of the resulting filter assembly in an upright vertical position is then sealed in a conventional manner and the top end portion is mounted on and sealed to a retaining ring which forms the open fluid inlet. The attachment to the ring is preferably performed by crimping the top portion of the bag assembly and sealing the crimped end around the ring by ultrasonic welding.

The overlapped side trailing edge of the wrapped composite is optionally secured to the underlying filter assembly to retain the cylindrical wrapped state. When used as a prefilter, the overlapped edge of the present assembly need not be spot welded or otherwise secured since walls of the outer final filter will retain the shape of the bag after it is inserted. Alternatively, the cylindrical shape can be maintained by an outer sleeve of the transport material.

Having generally described the invention, reference is now had to the accompanying drawings which illustrate preferred embodiments which are in no way to be construed as limiting to the scope of the invention as defined in the claims.

FIG. 7 is a partial sectional view of a wrapped filter bag fitted with vortex fluid inlet means, and.

Figure 1:
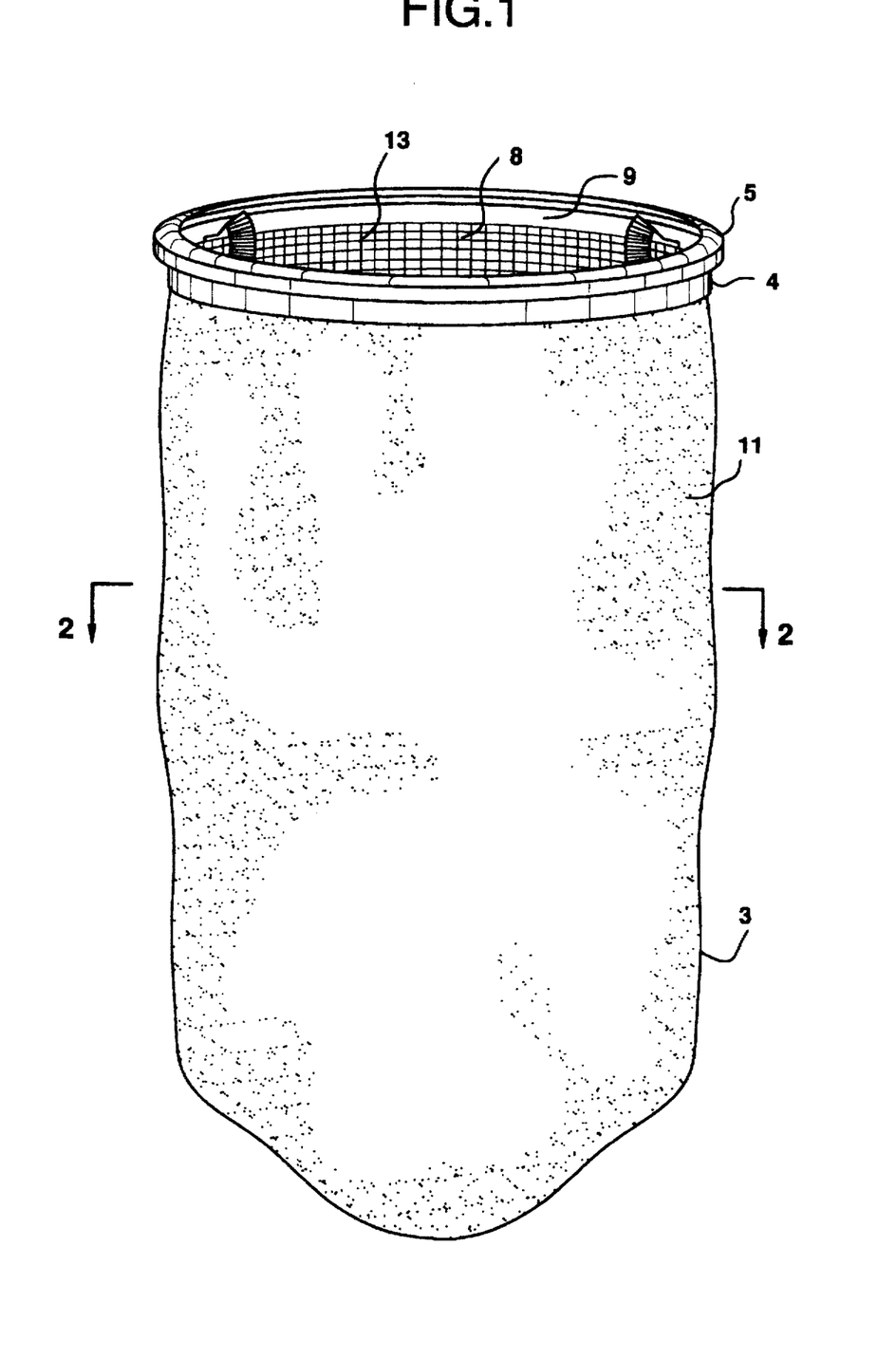
FIG. 1 is a perspective view of the wrapped filter bag.
Figure 2:
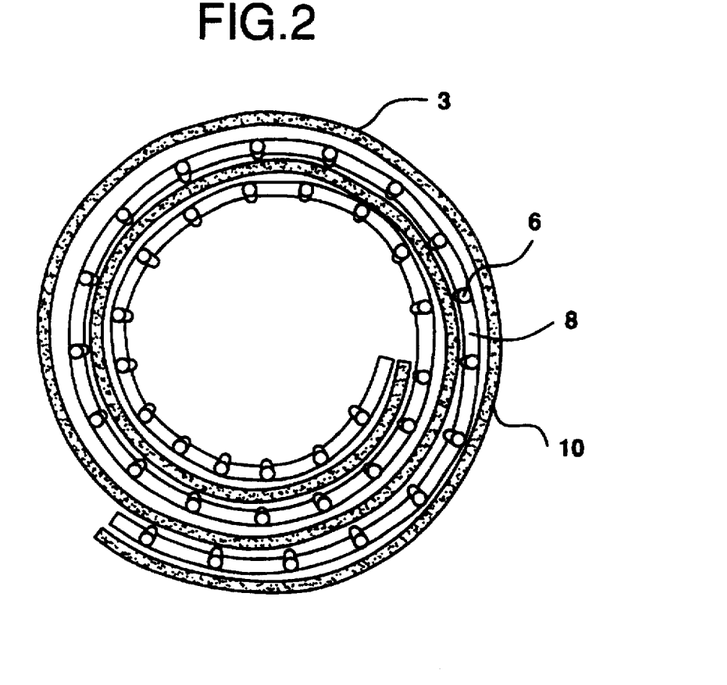
FIG. 2 is a cross section of the wrapped filter bag taken along line 2—2.

FIG. 1 displays wrapped filter bag 3 having its top marginal edge 4 crimped and sealed to cuff 9 of rigid retaining ring 5. FIG. 1 also shows outer membrane surface 11 and inner channeled transport surface 13 of wrapped filter bag In FIG. 2 there is displayed a cross sectional view of wrapped filter bag 3 showing the composite filter membrane 10 and transport means 8 having a plurality of vertical ribs 6 which support liquid transport channels, not shown. This figure illustrates the multi-layers formed of composite 8 and 10 the wrapping of filter bag 3.

Figure 3:
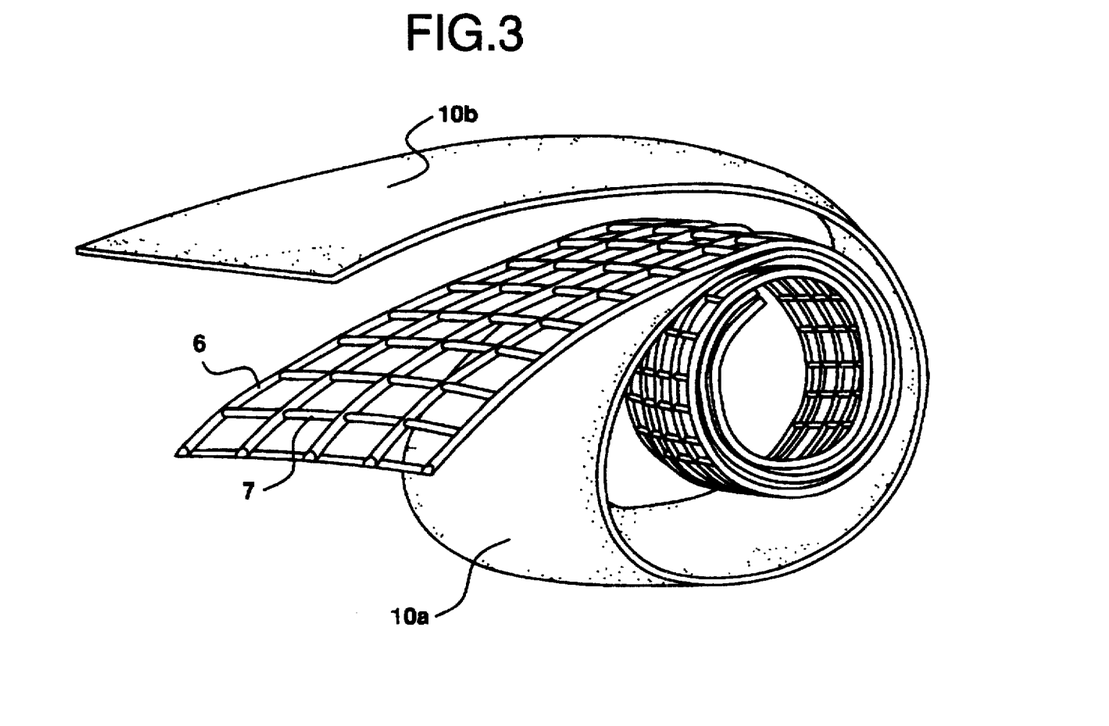
FIG. 3 is a partial fragmentary perspective view of the channeled transport means and filter membrane in a partially wrapped condition to provide layers of the filter assembly or composite.
Figure 4:
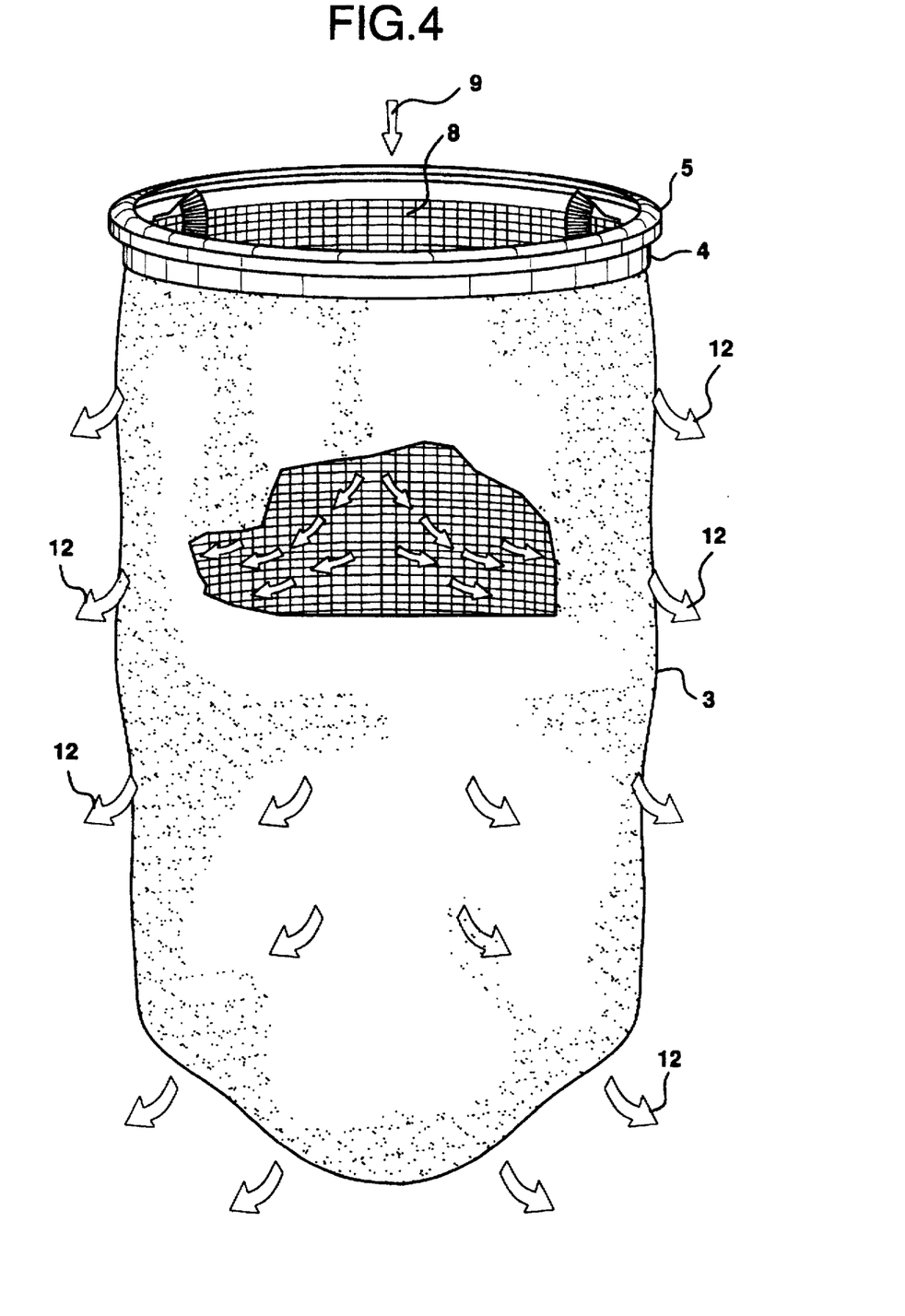
FIG. 4 is a partial fragmentary or broken perspective view of a wrapped filter bag with arrows showing the path of liquid flow through the bag.

FIG. 3 illustrates the manner of wrapping for the present filter bag and a detailed perspective view of transport means 8 having longitudinally disposed channels 6 and horizontally disposed channel supporting ribs 7. As shown, the transport means forms an interface between filter membranes 10a and 10b Arrows 12 in FIG. 4 illustrate the flow of liquid into and through layers of wrapped filter bag 3.

Figure 5:
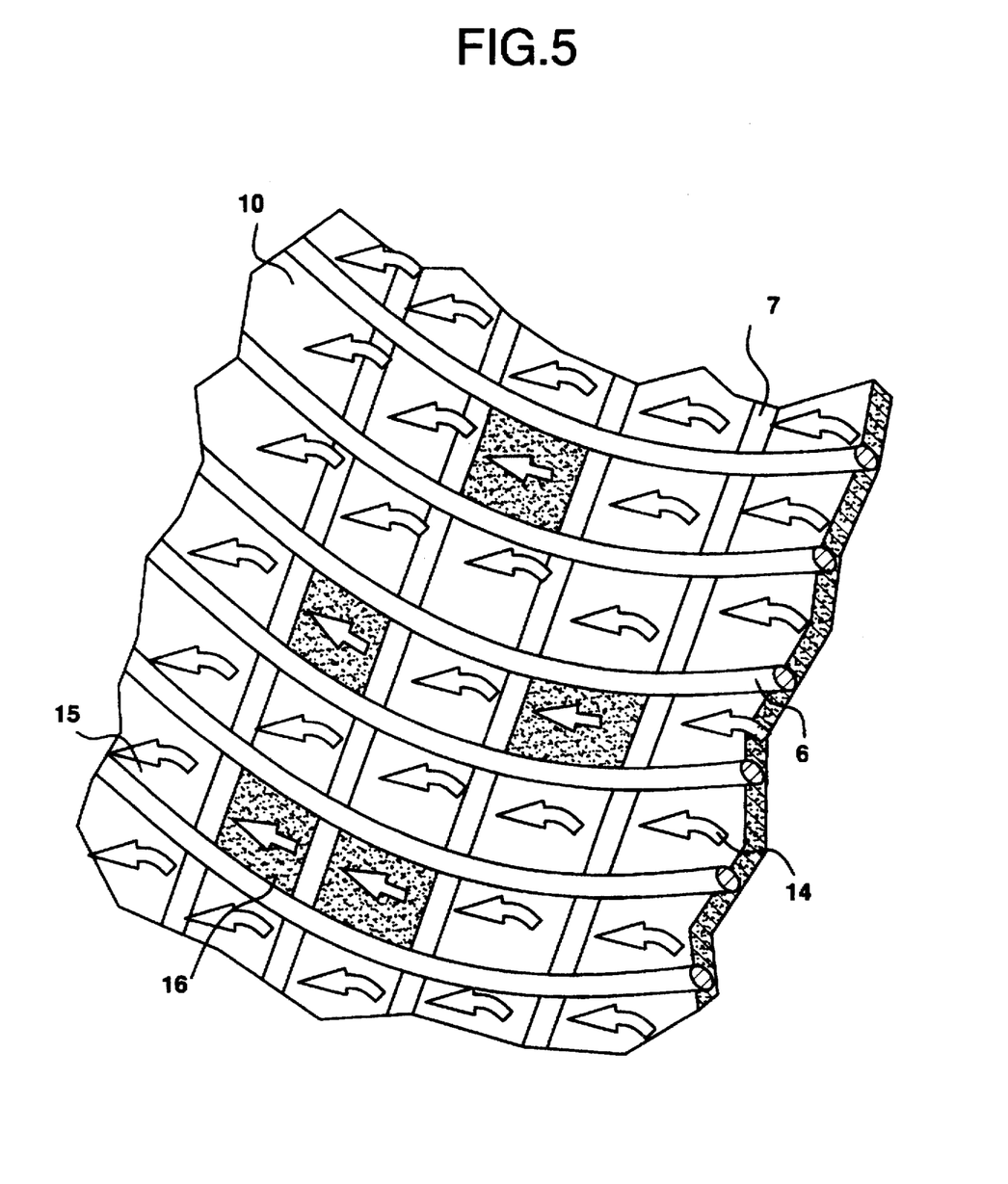
FIG. 5 is a partial fragmentary and sectional view of a portion of a channeled fluid transport web showing the parallel flow of liquid when pores of the membrane become blocked and radial flow through unblocked pores of the membrane.

The liquid flow path is shown in more detail in FIG. 5 wherein the liquid is generally passed in a radial path through unblocked membrane pores 15 of outer membrane surface 10 and wherein liquid is guided by channels 6 past blocked membrane pores 16 in a path substantially parallel to the filter membrane walls until radial flow can be resumed through a successive unblocked pore 15 of the membrane. The manner of liquid flow is illustrated herein by arrows 14.

Figure 6:
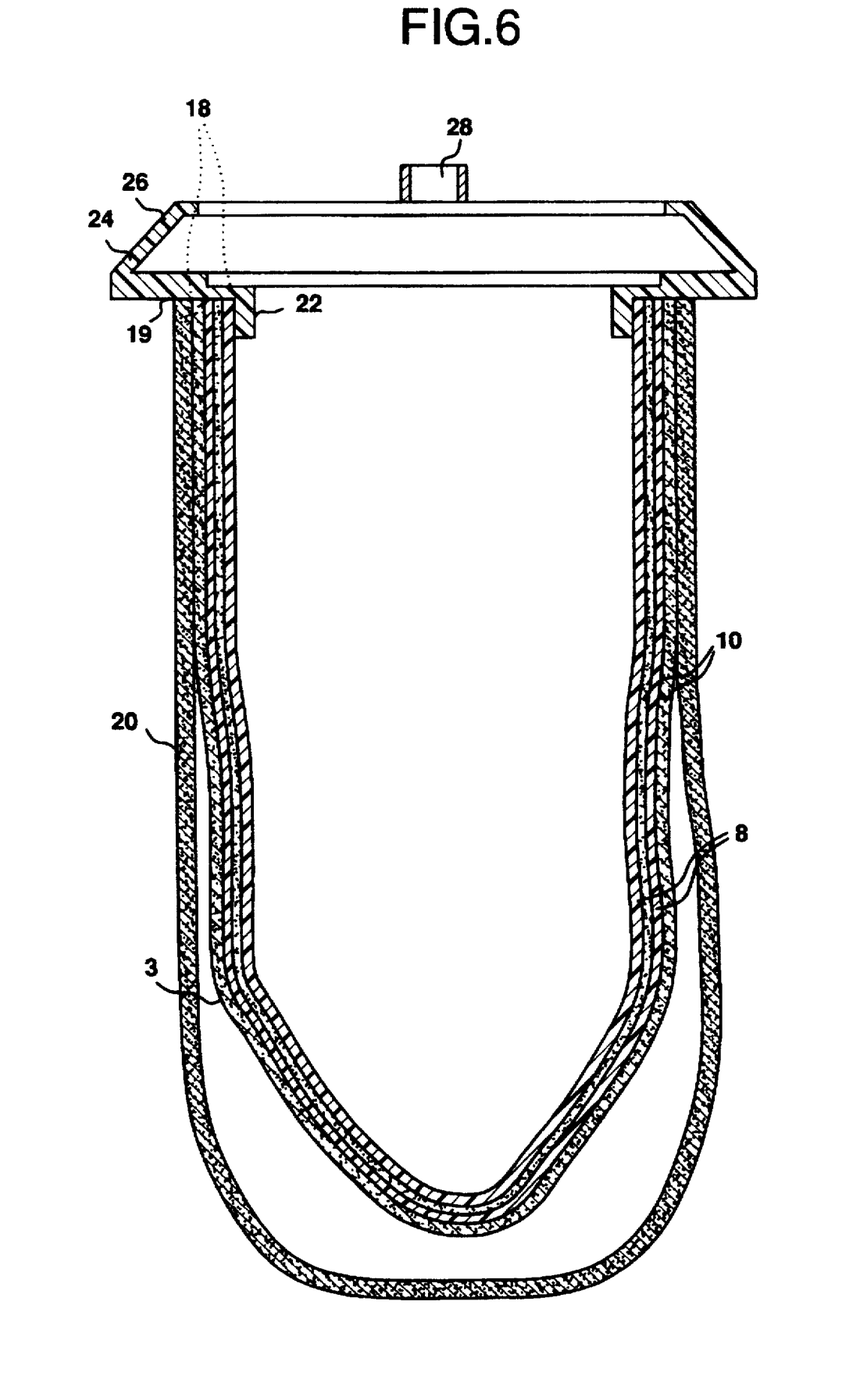
FIG. 6 is a sectional view of a wrapped filter bag employed as a prefilter inserted inside of a non-wrapped final filter bag.

The use of the present wrapped filter bag 3 as a prefilter assembly for conventional non-wrapped filter bag 20 is illustrated in FIG. 6. In this embodiment, top marginal edges 18 of wrapped bag 3 and top marginal edge 19 of bag 20 are crimped and sealed around lower flange 22 of polypropylene retaining collar 24 having upper lip 26 which is sealed around a central liquid entrance port in a manner described in U.S. Pat. No. 5,358,638 or 5,417,855.

Figure 7:
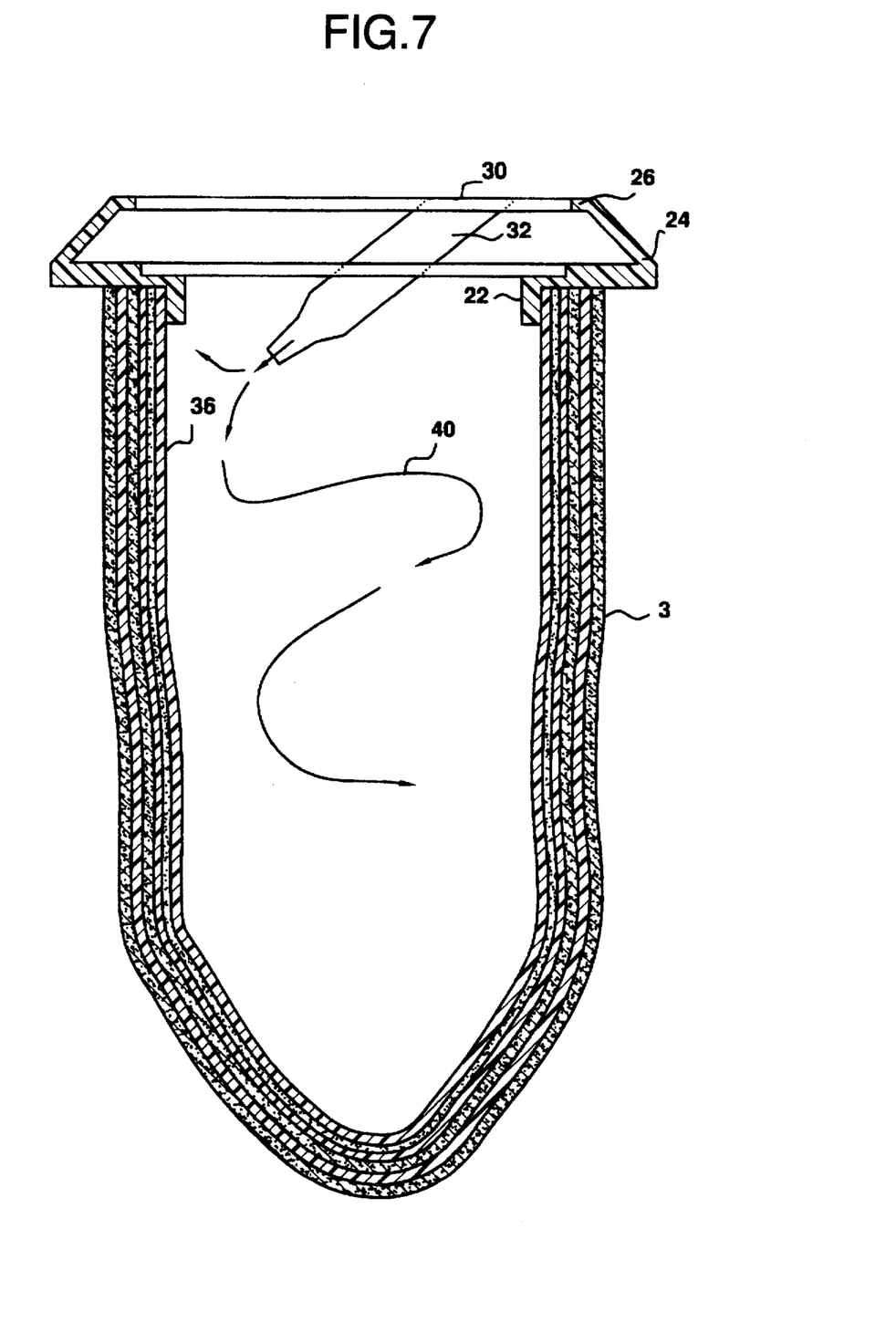

FIG. 7 is a modification of FIG. 6 wherein liquid entrance port 30, defined as feed pipe 32, is disposed to one side of collar upper lip 26 and directed slantwise to inner wall 36 of wrapped filter bag 3 having 3 convoluted layers of filter composite forming the walls of wrapped filter bag 3. The fluid enters bag 3 in a helical path as indicated by arrows 40 and is distributed around the upper, mid and lower inner surface of bag 3.

Figure 8:
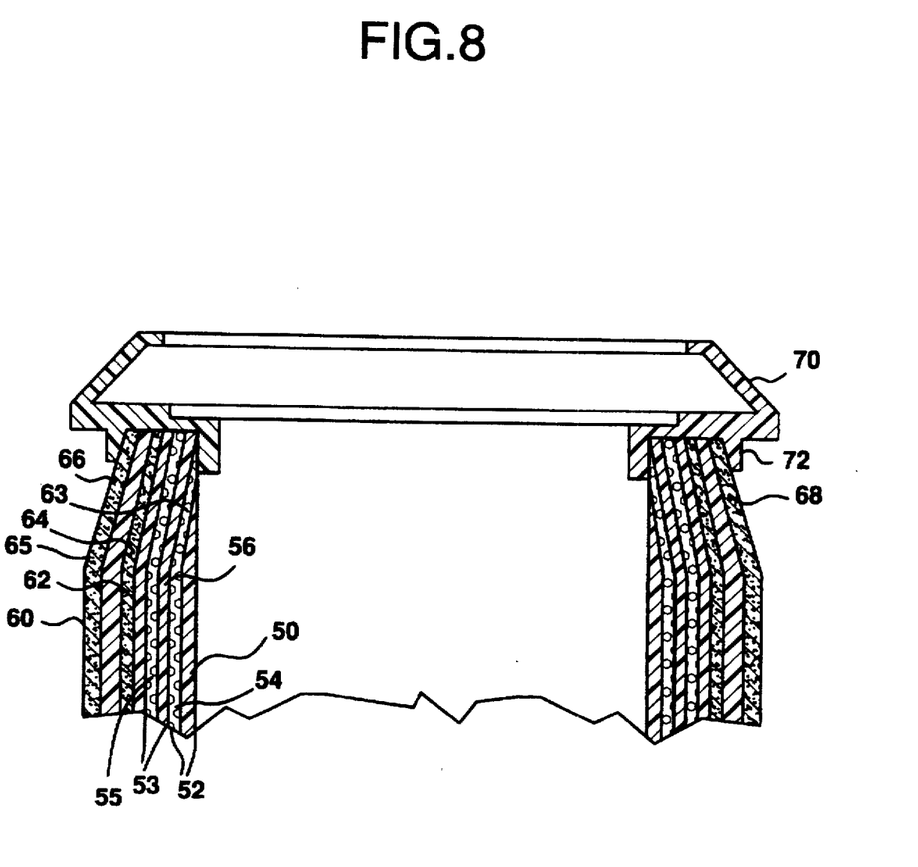
FIG. 8 is a partial sectional view of separate wrapped filter bags nested one within the other.

FIG. 8 shows wrapped filter bag 50 having two convolutions providing two filter layers 52 and 53 wherein membranes 54 and 55 have relatively large pore openings 56. Wrapped filter bag 50 is nested inside of outer wrapped filter bag 60, in this case also having two convolutions providing two additional filter layers 62 and 63 wherein membranes 64 and 65 have significantly smaller pore openings 66 than those of 54 and 55 so that during the filtration, larger particles are retained by membranes 54 and 55 while smaller particles are passed through to membranes 64 and 65 where they are trapped and separated from the filtrate.

It is to be understood that for commercial use each or both of bags 50 and 60 can have more than two wrapped layers, however, the simplest design has been selected for simplicity. The upper marginal edges of the nested bags are crimped together as shown by 68 and sealed to annular collar 72 of annular retaining ring 70; although it is within the scope of this invention to have separate retaining rings for each bag which are nestable and sealed to a common mounting device. The use of three or more nested filter bags of the present invention, having decreasing pore size in the direction of liquid flow, is also contemplated as being within the scope of this invention.

Having described preferred embodiments of the invention illustrated in the drawings, reference is had to the following example which compares the present filter bag, in the function of an internal prefilter for a commercial filter bag, with a non-wrapped prefilter bag lacking transport means employed in similar use.

EXAMPLE 1

A sheet of polypropylene melt blown filtration media, 30 inches wide and 60 inches long (basis weight of 6 oz./sq. yd.) having a pore diameter of 12µ was placed on a flat surface. A sheet of extruded polypropylene fluid transport netting having 16 solid raised channels/inch along its 60 inch length supported by perpendicular ribs spaced at about 0.1 inch was placed on top of the sheet of filtration media so that its marginal boundaries coincided, thus forming a composite assembly. A cylindrical mandrel of 6.5 inches diameter was placed on top of the composite which was wrapped around the mandrel 3 times to form a prefilter tube assembly having 3 layers of alternating filtration media and fluid transport netting. A series (4) uniformly spaced ultrasonic spot welds were used to secure the end of the outside surface of the wrap to the inner layers. The assembly was then removed from the mandrel and the bottom of the bag was sealed by ultrasonic weld to form a triangular 100 degree base portion. The open end of the bag was then crimped and secured around a plastic retaining ring collar as described in U.S. Pat. No. 5,075,004 by ultrasonic weld. A final filter bag assembly as described in said patent was placed over the prefilter bag and ultrasonically welded to said ring collar.

The resultant combination prefilter and final filter were then tested using one gram of SAE Fine Test Dust (ISO Fine having an average particle size of 25µ) per gallon of water. The slurry produced was pumped through the pre and final filter combination at a rate of 25 gals/minute until a differential pressure of 35 psi was reached at which point the filtration operation was halted and the amount of powder removed from the slurry was weighed. In this test, 108 grams of powder was removed. By way of comparison, when this test was repeated with a conventional single layer of membrane in the prefilter in place of the present wrapped filter, only 24 grams of powder was removed. Also the pressure differential of 35 psi was reached in one quarter of the time that it took for the first test.

What is claimed is:

1. A seamless filter bag for filtering a pressurized fluid formed of a composite filtration medium comprising an elongated filtration membrane sheet having an approximately uniform pore diameter within the range of from 2 to 50µ and a discrete elongated sheet of non-deformable plastic webbing overlying the membrane and having its marginal edges coextensive with that of the membrane; said webbing having a plurality of spaced channels extending its length which are reinforced by spaced ribs intersecting and integrally attached to said channels; said composite being wrapped upon itself in 2 to 5 convolutions to provide a cylinder having an equal number of composite filter layers and having its bottom end sealed against leakage and its top end sealed to a structural annular ring forming the fluid inlet to said filter bag and having the trailing edge of said wrapped composite secured to an underlying filter layer by spaced spot welding.

2. The filter bag of claim 1 wherein the pore diameter of the filtration membrane is between 5 and 20µ.

3. The filter bag of claim 1 wherein said channels are grooves extending above said ribs.

4. The filter bag of claim 1 wherein said composite is wrapped upon itself a minimum of 3 convolutions.

5. The filter bag of claim 1 wherein the filtration membrane is a thermoplastic selected from the group consisting of polypropylene, nylon and polyester.

6. The filter bag of claim 1 wherein the webbing is an extruded semi-rigid, thermoplastic.

7. The filter bag of claim 6 wherein the webbing is polypropylene.

8. The filter bag of claim 1 wherein the structural annular ring is fitted with vortex means to promote the flow of fluid in a circular motion around the inside wall of said filtration membrane.

9. The filter bag of claim 8 wherein said vortex means is an impeller blade actuated by the force of fluid entering the filter bag.

10. The filter bag of claim 1 wherein the structural annular ring is fitted with a venturi pipe having flexible side portions which can be constricted to decrease the flow rate of fluid entering the filter bag.

11. The filter bag of claim 1 wherein the webbing contains from 8 to 25 channels/inch of webbing width.

12. The filter bag of claim 11 wherein the webbing contains from 15 to 40 transecting ribs/inch of webbing length.

13. The filter bag of claim 1 which is nested in side of a non-wrapped commercial filter bag.

14. The filter bag of claim 1 having a filtration membrane of 10–15μ pore diameter which is nested inside of another filter bag of claim 1 having a filtration membrane of smaller pore diameter.

15. The product of claim 14 which is nested inside of a non-wrapped commercial filter bag.

16. The filter bag of claim 1 nested inside of a non-wrapped commercial filter bag wherein gaps between said spot welding permits flow of fluid from the wrapped filter bag to said non-wrapped filter bag.

17. The process of filtering a pressurized fluid slurry containing particles having an average particle diameter larger than the pore openings of said filtration membrane through the filter bag of one of claims 1, 3, 4, 8, 10, 13, 14 and 16.

18. The process of claim 17 wherein said fluid slurry enters the wrapped filter bag at a pressure of between about 0.2 and about 2,000 psi.

19. The process of claim 18 wherein said fluid slurry enters the wrapped filter bag at a pressure of between about 2 and about 150 psi.

20. The process of claim 17 wherein said wrapped filter bag filters fluid until 20–50 psi pressure differential is built-up between the layers of the filter bag.

21. The process of producing the seamless filter bag of claim 1 which comprises:

(a) laying an elongated filtration membrane on a flat surface;

(b) laying over the membrane to form a composite, a non-deformable semi-rigid plastic webbing whose marginal edges are coextensive with that of said membrane, said webbing having a plurality of channels along its length and disposed in the direction of intended fluid flow and having reinforcing ribs which transfect and are fixedly attached to said channels;

(c) wrapping said membrane and overlying webbing composite upon itself 2 to 5 times to provide an equal number of composite filtration layers in the form of a cylinder;

(d) sealing the bottom edge of said cylinder against fluid leakage and (e) sealing the top edge of said cylinder to an annular retaining ring which forms the fluid inlet to said filter bag.

22. The process of claim 21 wherein the nondeformable plastic webbing is initially attached to the underlying membrane.

23. The process of claim 21 wherein the face of the web on the trailing overlapped edge of said composite is secured to an underlying filter medium layer of the composite by spaced spot welding.

24. The process wherein the filter bag of claim 21 is inserted inside of a non-wrapped, standard filter bag assembly and is secured thereto.

25. A filter bag for filtering a pressurized fluid which comprises a pair of filtration membranes with a discrete, non-deformable semi-rigid plastic webbing between the pair of filtration membranes, said webbing having a plurality of elongated spaced channels disposed in the direction of fluid flow and supported and reinforced with spaced ribs which intersect and are integrally attached to said channels.

26. The filter bag of claim 25 wherein the pore diameter of the filtration membrane is between 2 and 50μ.

27. The filter bag of claim 25 wherein said channels are grooves extending above said ribs.

28. The filter bag of claim 25 wherein the webbing contains from 8 to 25 channels/inch of webbing width.

29. The filter bag of claim 28 wherein the webbing contains from 15 to 40 transecting ribs/inch of webbing length.

* * * * *